Oct. 11, 1955
R. E. DAY ET AL
2,720,078
BURNER FOR USE IN HIGH VELOCITY DUCTS
Filed March 1, 1948
2 Sheets-Sheet 1
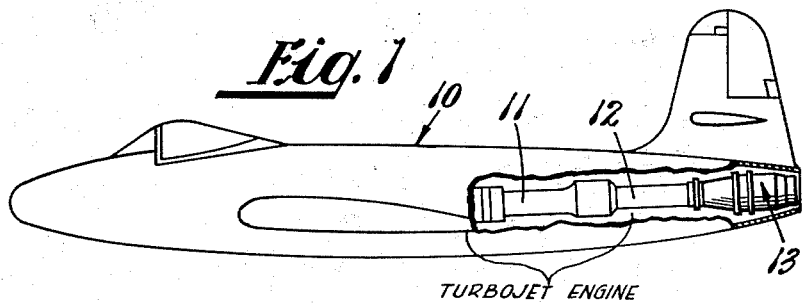
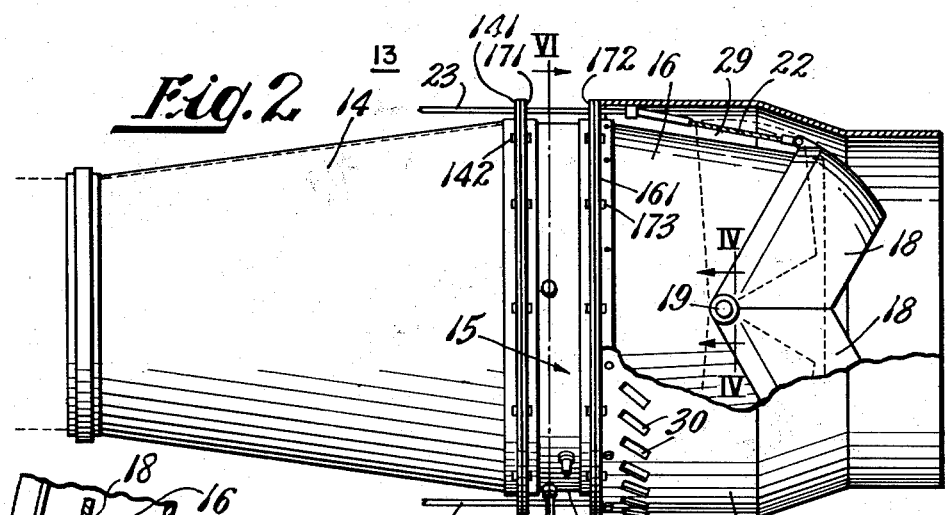
INVENTORS
AND R. E. DAY
F. J. HILL
BY
*E. Woodbury*
ATTORNEY

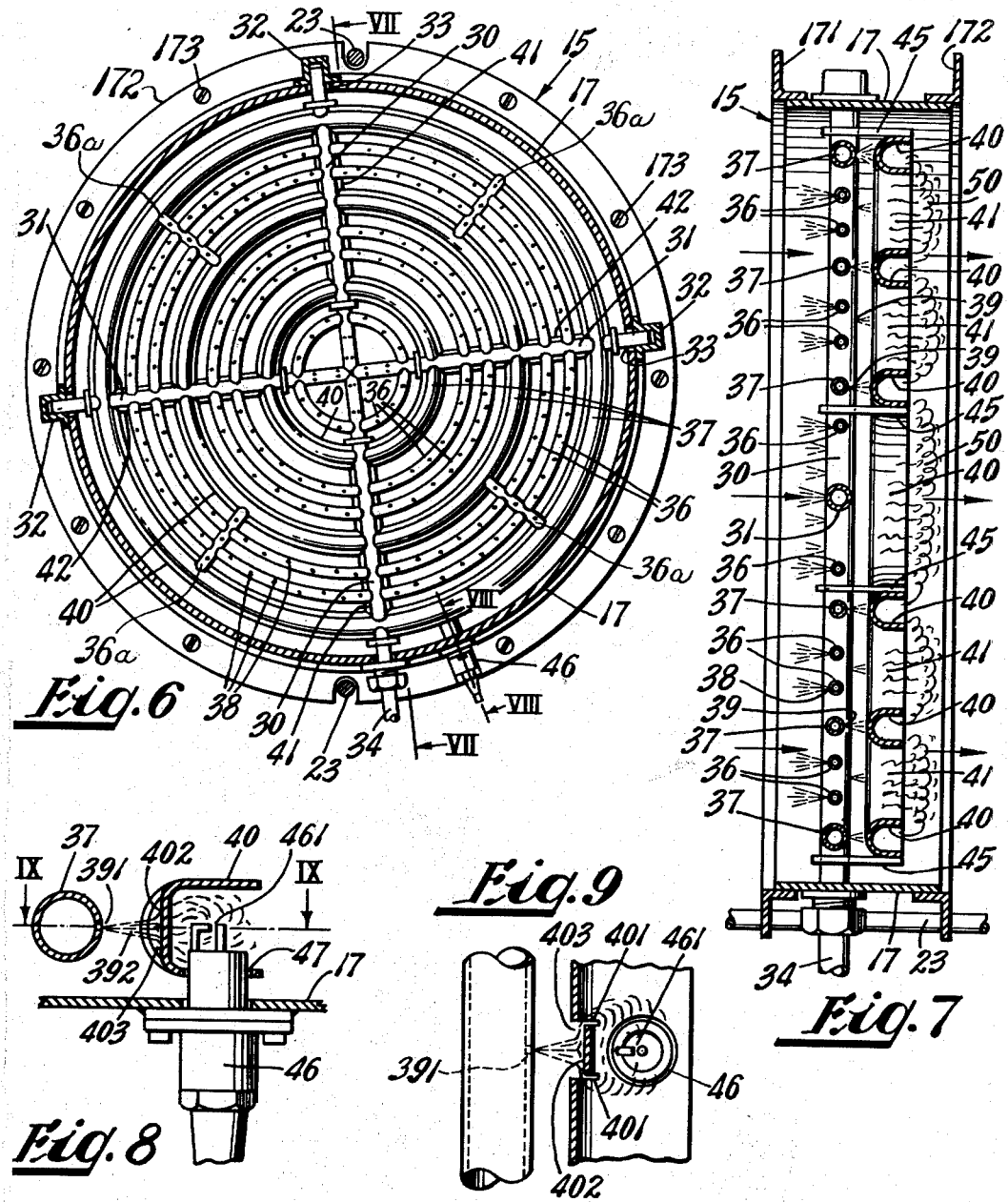

United States Patent Office 2,720,078
Patented Oct. 11, 1955

2,720,078

BURNER FOR USE IN HIGH VELOCITY DUCTS

Robert E. Day and Frederick J. Hill, San Diego, Calif., assignors to Solar Aircraft Company, San Diego, Calif., a corporation of California Application March 1, 1948, Serial No. 12,246

18 Claims. (Cl. 60—35.6)

This invention relates to devices auxiliary to aircraft jet engines, more particularly turbo-jet engines, but not specifically limited thereto, for augmenting the thrust by burning additional fuel with the exhaust air from the engine proper, such auxiliary devices being commonly known as "afterburners" and hereinafter referred to as such.

Afterburners are feasible because a turbo jet engine has to pump a large excess of air over that required for combustion of the fuel, to keep the temperature of the gas down to a value that is not destructive to the rotating turbine parts. By injecting and burning additional fuel in the exhaust stream from the engine the thrust can be greatly increased without raising the engine temperature.

A general object of the invention is to provide an afterburner that is efficient and at the same time relatively inexpensive to construct, install, and maintain.

Another object is to provide an afterburner that can be located very close to the rear end of the aircraft structure in which it is used.

Another object is to provide an afterburner capable of effecting very rapid combustion of fuel in a high velocity exhaust stream.

Another object is to provide an afterburner capable of propagating its full flame pattern very rapidly yet without detonation or explosion of unburned fuel.

Another object is to provide a burner having only a single means of fuel control yet capable of propagating its flame pattern in a turbulent high velocity stream of gas.

Another object is to provide a burner which tends to offset and smooth irregularities of the high velocity stream passing it.

Another object is to reduce the overall weight of an afterburner installation.

Another object is to provide an afterburner that is readily accessible for servicing or replacement.

Another object is to provide an afterburner that does not excessively heat adjacent parts of the aircraft fuselage or nacelle.

Another object is the provision of a new and improved apparatus for increasing the thrust effect of the exhaust gases of an internal combustion engine by mixing fuel with the exhaust gases and burning the mixture steadily and with relatively stable flame while maintaining a minimum pressure drop.

Other more specific objects and features of the invention will become apparent from the description to follow.

A number of problems are involved in the design of afterburners, one of which is prevention of damage to the afterburner tail pipe and the adjacent portion of the aircraft by the very highly heated exhaust gases issuing from the afterburner. In accordance with the present invention, such damage is prevented in part by locating the afterburner at the extreme aft or rear end of the aircraft so that only a small portion of the structure is adjacent the hot gases, and in part by special air cooling of the parts of the afterburner and the craft that are exposed to the extreme heat. In addition, the structure adjacent the hot gases may be fabricated of heat resistant material such as stainless steel without adding excessive weight or cost. However, locating the afterburner close to the point of discharge of the exhaust gas into the atmosphere raises a new problem, namely, that of completing combustion of the auxiliary fuel within a very short distance of the point where it is introduced into the gas stream, because only that combustion completed before discharge into the atmosphere has any useful effect. The difficulty of quickly burning fuel introduced into a blast of gas travelling at a rate in the range of 500 feet a second (340 miles per hour) is great. Yet, in accordance with the invention, combustion is completed within about .002 of a second, corresponding to a distance of travel of about two and one half feet.

Briefly, the burner structure embodied herein consists of a grid of fuel pipes through which the exhaust from the jet engine flows, the pipes having apertures through which the fuel is discharged in the form of fine jets into the exhaust stream. Some of the fuel-discharge apertures are directed upstream and others are directed downstream. The resultant downstream fuel jets impinge upon a flame stabilizing structure and cooperate therewith to produce continuous ignition of the fuel-exhaust gas mixture within a few inches of the zone of issuance of the fuel. The flame-stabilizing structure comprises a grid of channel members located on the downstream side of the fuel pipe grid. The channel members face downstream and provide intercommunicating spaces distributed over the cross section of the high velocity exhaust stream, in which spaces combustion maintains and spreads to the fuel-exhaust mixture flowing at high velocity therepast. Combustion may be started by an igniting device located within one of the channel members. The igniting zone caused by the slower eddy currents and more extended mixing makes possible this primary ignition by a simple spark plug and obviates far more complicated devices such as separate pilot fuel distributing systems, controlled timing regulation, etc. The simplicity and effectiveness of this device in producing foolproof ignition from plug to full stream in split second propagation is very important.

A further vitally important problem in after-burning is the maintenance of constant back pressure upon the turbine upstream under all conditions, especially while the flame is being propagated and at time of changes in the amount of fuel being fed to the burner. It is to be appreciated that in addition to the turbulence of the gas passing the burner at approximately 340 m. p. h., there are probably supersonic shock waves generated by the turbine blades traveling at supersonic tip speeds through the gas. There would be little difficulty in maintaining steady flame were considerable pressure drop available, but an essential feature of a suitable afterburner design is that it creates an absolute minimum of back pressure in order to get the most thrust possible. Therefore, the burner, despite the fact that it may only create a minimum of back pressure must have an inherently stable flame pattern designed to dampen and offset any irregularities in the approaching gas and above all, not to build up any vibratory frequencies or transmit any shock waves which might build up resonant vibrations. The back pressures involved make the problem roughly comparable to the maintenance of a steady candle flame in a gale.

The propagation and maintenance of relatively stable flame pattern, despite disturbances in the upstream gases, are advantageously affected by the features of the present design. Fuel is supplied to and discharged from the fuel distributing grid at such a rate that it remains liquid within the grid despite the fact that the temperature in the duct is approximately 1200 degrees F. Thus, the jets are not appreciably affected by differential pressures in the turbulent high velocity stream and make for a symmetrically patterned, nearly uniform, distribution of vaporized fuel throughout the cross section, regardless of fluctuations in and possible mal-distribution of the gas stream. This fuel spray vaporizes rapidly in the hot and turbulent exhaust gases from the primary engine, forming a similarly substantially uniform blanket of selectively vaporizing and maturing mixture as it passes the channel members. The uniform pattern of fuel distribution, plus the fact that a flame front is established only a few inches downstream and in time only about $\frac{1}{2000}$ second does not allow time or space for the vaporized fuel pattern to be much disturbed by even violent disturbances in the entering gases. The mixture tends to reestablish and rekindle to uniform flame pattern and dampen upstream irregularities, for of the two components going into this combustion, the one is steady and acts as a steadying influence on the union.

In terms of safety, the design precludes the possibility of detonation or explosion. Air and fuel vapor are not allowed time enough to combine sufficiently to support combustion, much less detonate until swirling in the channel-formed eddy currents downstream of this point.

A full understanding of the invention may be had from the following detailed description with reference to the drawing, in which:

Fig. 1 is a side elevation of an airplane with a portion of the fuselage broken away to show the location of an afterburner in accordance with the invention;

Fig. 2 is a side elevation of an afterburner in accordance with the invention, with a portion of the shroud broken away;

Fig. 3 is a rear end view of the afterburner;

Fig. 4 is a detail vertical section taken in the plane IV—IV of Fig. 2;

Fig. 5 is a detail vertical section taken in the plane V—V of Fig. 3;

Fig. 6 is a cross section showing the burner, the section being taken in the plane VI—VI of Fig. 2;

Fig. 7 is a longitudinal section through the burner, the section being taken in the plane VII—VII of Fig. 6;

Fig. 8 is a detail section taken in the plane VIII—VIII of Fig. 6; and

Fig. 9 is a detail section taken in the plane IX—IX of Fig. 8.

Referring to Fig. 1 there is shown a jet plane 10 having a power plant consisting of a primary combustion device 11, which may be a turbojet engine, an engine tail pipe 12, and an afterburner 13, the latter discharging gas for propulsion from the rear end of the aircraft 10. In accordance with well known practice, the jet engine or primary combustion device 11 delivers exhaust gas carrying a large percentage of air and at a temperature of say 1200° F. to the engine tail pipe 12 which conveys it to the afterburner 13. The latter adds additional fuel, mixes it with the primary exhaust gas, ignites the mixture and discharges it into the atmosphere. The secondary combustion that takes place in the afterburner substantially increases the temperature and velocity of the gases.

Referring to Fig. 2, the afterburner 13 consists of a diffuser 14, a burner section 15, and an afterburner tail pipe section 16. The diffuser 14 constitutes a transition of increasing diameter which connects the engine tail pipe 11 with the burner section 15. The burner section 15 in turn connects to the afterburner tail pipe section 16 of decreasing diameter, from which the secondary exhaust gas is discharged. As shown in Fig. 2, the rear end of the diffuser 14 is provided with a flange 141 which is bolted as by bolts 142 to a flange 171 on the forward end of a tubular casing 17 of the burner section 15. The latter has at its rear end a flange 172 which may be joined by bolts 173 to a flange 161 on the forward end of the afterburner tail pipe 16. The interior construction of the burner section 15 will be described later.

In order to obtain the full benefit of an afterburner it is necessary to increase the effective diameter of the nozzle through which the exhaust gas is discharged into the atmosphere when the afterburner is in operation. As shown in Figs. 2, 3, and 5, a variable orifice structure is provided which consists of a pair of gates 18, 18 of identical structure which are adapted to open and close substantially the same as the human eyelids. Thus, the gates are of approximately semispherical shape and are both pivotally connected by pivot pins 19 to brackets 20, Figure 4, which in turn are secured to the afterburner tail pipe 16. Each of the gates 18 is shown as manipulated by a cable 22 on the end of a rod or cable 23 extending to a suitable control mechanism at some forward point on the aircraft. The rods or cables 23 are actuated in unison to open or close the gates 18. The latter are shown in closed position in Figs. 2, 3, and 5, in which positions they provide an orifice of somewhat irregular oval shape but of substantially smaller diameter than the rear end of the afterburner tail pipe 16. On the other hand, when the gates 18, 18 are opened by pulling on the rods or cables 23 they are carried completely outside of the tail pipe 16 and forwardly of the rear edge thereof, so that they are completely inactive and have no effect on the discharge of secondary exhaust gas through tail pipe 16. As illustrated in Fig. 5, when the gates 18 are in closed position, they seal with the tail pipe. To this end, a flange 181 is provided on each of the gates 18 which flanges are juxtaposed to a circular flange 162 on the tail pipe 16 and compress a gasket 25 of suitable refractory material such as woven wires of heat resistant alloy.

As has been previously indicated, the combustion in the afterburner raises the secondary exhaust gas to a very high temperature, and the afterburner tail pipe 16 is of course exposed to this temperature. If no special means were employed to cool the tail pipe, it would be raised to temperatures which no known practicable metals would withstand. However, in practice, the temperature of the tail pipe is maintained within reasonable limits by circulating cool air therepast by means of a shroud 28 which surrounds the tail pipe 16 and extends therebeyond to form an annular space 29 therebetween. Air is admitted to the forward end of this space 29 through apertures 30 provided in the shroud 28. As clearly shown in Fig. 2 these apertures are elongated and are arranged at angles to the transverse plane so that they overlap and provide a substantially circumferentially continuous annular stream of air through the space 29. A rapid flow of air is induced inwardly through the apertures 30 by the suction or aspirating effect of the hot secondary exhaust gases issuing from the tail pipe 16 when the gates 18 are open. Although cooling air also flows through the space 29 when the afterburner is not in operation, and the gates 18 are closed, it is not essential at such times because of the relatively low temperature of the primary exhaust gas that is delivered by the jet engine.

As previously indicated, the burner is mounted within the tubular casing 17 and it will now be described with reference to Figs. 6 to 9 inclusive.

Fuel is distributed in a uniform pattern over substantially the entire cross section of the tubular housing 17 by means of a grid or network of fuel pipes arranged in a transverse plane within the casing 17. The essential framework of this network may consist of two crossed pipes 30 and 31 which are interconnected at their point of crossing and extend into supporting sockets 32 mounted on the exterior of the casing 17, apertures 33 being provided in the casing 17 to permit the passage of the pipes. Both ends of the pipe 31 are sealed and supported in a pair of diametrically opposite sockets 32. However, only one end of the pipe 30 is sealed and supported in a socket 32. The other end connects with a fuel supply pipe 34 through which liquid fuel is supplied under pressure for the entire network. By virtue of the fact that the ends of the pipes 30 and 31 do not extend clear to the ends of the sockets 32, provision is made for the necessary expansion and contraction of the network as it heats and cools.

The two crossed pipes 31 and 30 support and supply fuel to a large number of concentric smaller pipes 36 and 37 all arranged in the same transverse plane. All of the pipes 36 and connecting branches 36a have forwardly directed apertures 38 for injecting liquid fuel in upstream direction. On the other hand, all of the pipes 37, and the crossed pipes 31 and 30, have rearwardly directed apertures 39, with exception of the center portions of pipes 30, 31, within the innermost pipe 36, which have forwardly directed apertures. The outermost concentric pipe 37 may be of larger diameter than the remainder to function as a distributing pipe.

There is juxtaposed to each of the pipes 37 and the crossed pipes 31 and 30 a structure for igniting and maintaining ignition of the mixture of fuel and primary exhaust gas that flows through the fuel pipe network. This structure comprises a plurality of gutters 40, 41, and 42. The gutters 40 are annular and are juxtaposed to the anular fuel pipes 37. The gutter 41 extends diametrically and is juxtaposed to the diametrical fuel pipe 30. The gutter 42 extends diametrically in juxtaposed relation to the diametrical fuel pipe 31.

As shown in Fig. 7, all of these gutters are of channel cross section, are positioned in the same plane downstream of the fuel pipe network, and their open sides face downstream. Wherever the gutters 40, 41, and 42 intersect, they interconnect to form a continuous protective passage, although this passage is of course open on the downstream side. The gutter grid or network is supported in suitable spaced relation to the fuel pipe network by short longitudinal supports 45 that are welded to the gutters and are slidable on the radial fuel pipes 30 and 31 to permit differential radial expansion of the two systems. The gutters get much hotter than the fuel pipes, since the latter are cooled by the fuel flowing therethrough.

To start combustion, a spark plug 46 may be used. As shown in Figs. 6 and 8 this spark plug extends through the tubular casing 17 and through an aperture 47 provided therefor in the outermost annular gutter 40, the spark gap 461 of the plug being located within the channel. To provide a rich mixture adjacent the spark gap 461 the fuel pipe 37 that is positioned immediately in front thereof may be provided with an extra large downstream directed fuel discharge aperture 391 which discharges a jet 392 of fuel against a baffle 402 located just back of an opening 403 in the upstream wall of the gutter 40 juxtaposed to the gap 461. The baffle 402 may be formed by making two transverse saw cuts 401 in the gutter and bending the portion of the gutter between the saw cuts inwardly. The jet of fuel 392 impinging on the baffle 402 is atomized and produces a rich mixture immediately back of the baffle 402 in the vicinity of the spark gap 461 and produces a twin swirl of especially rich mixture in the gutter adjacent to the baffle 402 and at the source of ignition 461. This is in addition to the fuel air mixture eddying around the edges of the gutter and swirling within it both here and elsewhere.

The upstream apertures 38 are preferably relatively fine. They may have a diameter in the neighborhood of 0.025 inch, and the fine jets of fuel sprayed therefrom are vaporized almost instantly in the primary exhaust stream from the jet engine, which may be at a temperature of about 1200° F. Furthermore, the pipes 36 produce a turbulence which mixes the fuel vapor with the primary exhaust. The downstream apertures 39 direct their jets against the closed sides of the gutters 40 immediately downstream therefrom, which breaks up these jets by target atomization. The fuel and primary exhaust are further mixed by the turbulent action of the gutters. The gas rushing past the outer lips of the gutters forms areas of reduced pressure which in turn causes the gas to swirl into the gutter channels. This produces conditions in the gutter channels very favorable to flame propagation, and flame is propagated very rapidly from the spark gap 461 of the spark plug 46 throughout the gutter network, and is thereafter maintained in the gutter channels as long as the fuel is supplied. This flame in the gutter channels functions as a very extensive pilot flame distributed over the entire cross section of the primary exhaust stream, to ignite the mixture flowing at high velocity between the gutters. The flame front is carried slightly downstream between the gutters as indicated at 50 in Fig. 7, but not to any serious degree.

At the time of ignition, the flame forms initially in the gutters before spreading to the space between the gutters, although the time interval is very small. This is a highly desirable characteristic, because ignition becomes explosive and may reach destructive proportions when it occurs instantaneously over the whole cross section.

Thus it appears that by virtue of the eddying of the gas and fuel into the gutters past the downstream edges thereof, a mixing sufficient to support combustion in the gutters occurs before the mixing has proceeded that far in the portions of the stream that flow past the gutters. Hence, the flame from the gutters spreads into the stream rushing therepast in that longitudinal portion of the stream where the mixing of the fuel and air is approaching the stage where combustion can occur. Mixing to the combustible stage does not occur throughout the stream at the same transverse plane. The flame from the gutters is present to initiate combustion in each portion of the cross section of the stream as mixing in that portion reaches the combustion-supporting stage.

The result is smooth flame propagation and pressure build-up without detonation. On the other hand, in the prior art, when mixing to a combustible stage is completed over the entire cross section prior to ignition there is no such control present to prevent instantaneous propagation, i. e., explosion with destructive pressures.

After initial ignition, the constant piloting tends to reestablish stable pattern after any fluctuation. Such cannot be said for any device where combustibles in explosive proportions are fully mixed.

Of course, the afterburner structure interferes to a certain extent with the free flow of the primary exhaust gas during normal operation, when the afterburner is not in operation. Experiments have indicated that a suitable compromise between the best efficiency obtainable without the afterburner in operation and the best efficiency obtainable with the afterburner in operation is obtained when the projected area of the fuel pipes and gutters is about 40% of the area of the tubular casing 17. This ratio may vary between 35% and 45%, but is preferably kept between 38% and 43%.

Summarizing, the afterburner design described provides:

1. Protection against detonation or explosion.
2. Protection against destructive vibration and possible pulsing between the afterburner and the turbo-jet engine.
3. A low pressure drop through the burner.
4. Maintenance of uniform back pressure on the turbo-jet engine through all conditions of the afterburner.
5. Sufficient cooling of the afterburner to give it a reasonable life.

Although for the purpose of explaining the invention, a particular embodiment thereof has been shown and described, obvious modifications will occur to those skilled in the art, and we do not desire to be limited to the exact details illustrated.

Subject matter broadly disclosed but not claimed herein is claimed in Patent No. 2,688,843 granted September 14, 1954.

We claim:

1. An afterburner comprising a duct including a mixing zone; a combustion zone adjacent and downstream of said mixing zone; a structure in said combustion zone comprising a grid of interconnected members arranged transversely of said duct, said members being trough shaped in cross section with their open ends facing downstream in said duct; and a fuel distributor in said mixing zone for distributing fuel to the gases passing therethrough and operatively positioned in said duct to impinge a portion of the fuel upon adjacent trough shaped members, whereby a portion of the mixed gases and fuel passing between the members eddy around the edges of the members and into sheltered combustion zones formed by the troughs thereof to maintain a sheltered primary flame throughout said grid to continuously ignite and propagate relatively stable burning of the remaining mixed gases and fuel passing said grid.

2. A burner comprising a duct having a mixing zone and a combustion zone adjacent and downstream of said mixing zone; a fuel distributor in said mixing zone for adding and substantially evenly distributing fuel to gases passing therethrough; and a grid structure in said combustion zone for igniting and maintaining combustion of the mixed gases and fuel, comprising spaced and intersecting members arranged transversely of said duct, said members being trough shaped in cross section with their open ends facing downstream in said duct and the channels of intersecting members communicating with each other at the intersections, whereby a portion of the mixed gases and fuel passing between the members eddy around the edges of the members and into the sheltered combustion zones formed by the troughs thereof to maintain a sheltered primary flame throughout said grid structure to continuously ignite and propagate burning of the remaining mixed gases and fuel passing said grid; the communication between said grid members at their intersections serving to allow the primary flame to propagate itself throughout the grid from a flame in any portion thereof.

3. The burner as set forth in claim 2 in which fuel is fed into said distributor adjacent its bottom.

4. For use in combination with a structure having an outlet for gases containing a combustion supporting component; a duct adapted to be connected to said outlet; a distributor in said duct having a plurality of supply passages for a complemental combustion supporting component and forming a plurality of mixing zones in said duct through which said gases pass and into which said complemental component is discharged; a main combustion zone in said duct downstream of said mixing zones; a structure in said main combustion zone forming a plurality of sheltered combustion zones communicating with the peripheries of the downstream ends of said mixing zones; said distributor being operatively positioned to impinge a portion of said complemental component against adjacent sheltered zone structure; and ignition means for said sheltered zones to initiate a primary flame therein; said sheltered combustion zones operative to maintain substantially continuous igniting and combustion supporting flames around the peripheries of the combustible mixtures adjacent the downstream ends of said mixing zones whereby substantially continuous relatively stable flame propagation is maintained throughout said mixtures in said main combustion zone and destructive detonation is avoided.

5. The combination as set forth in claim 4 in which said ignition means is located adjacent the bottom of the lowermost of said sheltered zones.

6. A burner comprising a duct including a mixing zone, and a combustion zone adjacent and downstream of said mixing zone; a fuel distributor in said mixing zone for feeding fuel to gases passing therethrough, comprising spaced fuel supply pipes arranged in said mixing zone transversely of said duct, the pipes discharging fuel downstream toward said combustion zone as well as upstream and away from said combustion zone; and a grid in said combustion zone forming sheltered combustion zones for igniting and maintaining combustion of the mixed gases and fuel, comprising a number of interconnected members arranged transversely of said duct, whereby a portion of the gases and fuel passing between the members eddy around the edges of the members and into the sheltered combustion zones to form a sheltered primary flame to continuously ignite and propagate a relatively stable burning of the remaining mixed gases and fuel passing said grid.

7. A burner comprising a duct having an inlet and an outlet for admitting and discharging gases at high velocity, said duct including a mixing zone and a combustion zone downstream of said mixing zone; a distributor for adding and substantially evenly distributing fuel to the gases passing through the duct, comprising a first grid of spaced fuel supply pipes arranged in said mixing zone transversely of said duct, certain of the pipes forming said grid having outlets discharging fuel downstream toward said combustion zone and others of said pipes having outlets discharging fuel upstream and away from said combustion zone; and a second grid in said combustion zone forming sheltered combustion zones for igniting and maintaining combustion of the mixed fuel and gases, comprising a number of spaced and intersecting trough shaped members arranged transversely of said duct with open ends facing downstream in said duct, and the channels of intersecting members communicating with each other at the intersections; said first grid of fuel supply pipes being so disposed with respect to the members forming said second grid that the fuel discharged downstream from said fuel supply pipes impinges upon the members forming said second grid and is atomized before mixing with the remaining mixture of fuel and combustion supporting gases passing between the members forming said second grid.

8. In the apparatus described in claim 7 at least one of said channel shaped members having an opening therethrough on its upstream side to receive fuel being discharged by one of the outlets discharging fuel downstream, a baffle within the channel shaped member and in alignment with said opening for atomizing the fuel received through said opening and dispersing it within said member; and a combustion initiating element adjacent said baffle.

9. In a reaction type device wherein combustion supporting gases are heated and allowed to expand to provide a propelling reaction, a duct having an inlet and an outlet; means in said duct for adding and substantially evenly distributing and mixing fuel with the gases passing through the duct comprising a first grid of connected spaced fuel pipes having openings for discharging fuel into the duct; and a second grid between said first grid and said outlet to provide a plurality of sheltered combustion zones, one of said grids having supporting elements thereon, said duct having means receiving said elements constructed and arranged to permit contraction and expansion of said one grid, the other of said grids having integral elements carried by said first mentioned elements and slidable thereon to permit differential expansion and contraction of said grids with respect to each other and to said duct.

10. A device for providing a sheltered combustion zone in a burner, comprising a grid formed of a number of spaced and intersecting trough shaped members having their open ends facing in the general direction of gas flow past the grid, the channels of intersecting members communicating with each other at the intersections.

11. A device for providing a protected combustion zone in a burner, comprising a grid formed of a number of spaced and intersecting trough shaped members having their open ends facing in the general direction of normal gas flow past the grid, the channels of intersecting members communicating with each other at the intersections; and a firing device within the trough of at least one of said members to initiate combustion with the protected combusion zone.

12. In a burner adapted to be located in a stream of combustion supporting gases, a sheltered combustion grid comprising a plurality of trough shaped members, one of said members having a transverse slot in its bottom wall, and a baffle joining the side walls of said member within the trough and in alignment with said slot.

13. In combination, structure forming a plurality of mixing zones through which gases containing combustion supporting components pass; a plurality of combustion zones downstream of said mixing zones; means for supplying a component to form a combustible mixture with said gases in said mixing zones; a plurality of sheltered combustion zones adjacent the downstream ends of said mixing zones; ignition means for said sheltered zones; and means to deliver combustible fuel mixture to said sheltered zones operative to maintain anchored igniting and combustion supporting flames adjacent the downstream ends of said mixing zones, which maintain continuous relatively stable flame propagation through said mixture in said combustion zones.

14. The combination as set forth in claim 13 in which said flames are anchored outside of said combustion zones.

15. In an internal combustion jet power plant of the type comprising a primary combustion device delivering primary exhaust gas relatively rich in air in combination with an afterburner for adding fuel to said primary exhaust gas and burning it to produce a secondary exhaust gas of higher temperature and velocity, the afterburner construction comprising: a tubular casing for receiving said primary exhaust gas; a network of fuel pipes in a transverse plane within said casing comprising a plurality of circular pipes interconnected by a plurality of radial pipes, said pipes having apertures for the discharge of fuel therefrom into the primary exhaust gas passing through said casing; and means for igniting and maintaining ignition of the mixture of fuel and primary exhaust gas comprising a plurality of channel-shaped circular gutters interconnected by a plurality of radial gutters adjacent said fuel pipes on the downstream side thereof, the open sides of said gutters facing downstream, said gutters being aligned with at least a portion of said fuel pipes whereby the fuel discharge apertures of said portion of the pipes are directed downstream onto said gutters.

16. In a burner adapted to be located in a stream of combustion supporting gases; a trough shaped member having an opening in the closed side thereof; a fuel distributor adjacent said trough shaped member, operative to direct fuel through said opening; and a baffle within the trough of the member for atomizing fuel passing through the opening and directing it longitudinally within said trough.

17. In combination with the structure defined in claim 16, an igniting means within said trough.

18. Propulsive thrust generating apparatus comprising a duct, structurally formed to present forward propulsive thrust reacting surfaces, through which exhaust gases containing combustion supporting components pass at a velocity higher than the normal rate of flame propagation through said gases; distributing structure in said duct to supply fuel to form combustible mixtures with said exhaust gases; a mixing zone upstream of said distributing structure; a mixing zone downstream of said distributing structure; a main combustion zone downstream of said downstream mixing zone; and structure in said combustion zone for igniting and maintaining combustion of the combustible mixtures passing therethrough, said combustion zone structure comprising a plurality of mixture deflector members forming sheltered combustion zones adjacent the upstream end of said combustion zone, and said distributing structure being operatively positioned to impinge a portion of the fuel upon adjacent deflector members, whereby a portion of the combustible mixtures passing between said members eddy into said sheltered combustion zones to maintain a sheltered primary flame to continuously ignite the remaining combustible mixtures passing said members from said downstream and upstream mixing zones to generate a thrust producing gaseous mass.

References Cited in the file of this patent

UNITED STATES PATENTS

| 1,839,880 | Hyatt | Jan. 5, 1932 |
| 2,249,489 | Noack | July 15, 1941 |
| 2,304,008 | Müller | Dec. 1, 1942 |
| 2,385,833 | Nahigyan | Oct. 2, 1945 |
| 2,409,176 | Allen | Oct. 15, 1946 |
| 2,456,402 | Goddard | Dec. 14, 1948 |
| 2,464,724 | Sédille | Mar. 15, 1949 |
| 2,479,776 | Price | Aug. 23, 1949 |
| 2,479,777 | Price | Aug. 23, 1949 |
| 2,482,505 | Pierce | Sept. 20, 1949 |
| 2,510,572 | Goddard | June 6, 1950 |
| 2,517,015 | Mock et al. | Aug. 1, 1950 |
| 2,520,388 | Earl | Aug. 22, 1950 |

FOREIGN PATENTS

| 588,096 | Great Britain | May 14, 1947 |
| 920,387 | France | Jan. 4, 1947 |
| 920,731 | France | Jan. 4, 1947 |
| 920,910 | France | Jan. 8, 1947 |

OTHER REFERENCES

S. A. E. Journal, September 1946, pages 507 and 508.
Scientific American, November 1947, page 220.